(12) United States Patent
Austin et al.

(10) Patent No.: US 11,537,590 B2
(45) Date of Patent: Dec. 27, 2022

(54) SYSTEMS AND METHODS FOR COMPUTER ASSISTED DATABASE CHANGE DOCUMENTATION

(71) Applicant: Walmart Apollo, LLC, Bentonville, AR (US)

(72) Inventors: Daniel Bryan Austin, Bentonville, AR (US); Chris Spicer, Centerton, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 324 days.

(21) Appl. No.: 15/938,825

(22) Filed: Mar. 28, 2018

(65) Prior Publication Data

US 2018/0285407 A1    Oct. 4, 2018

Related U.S. Application Data

(63) Continuation of application No. 62/477,504, filed on Mar. 28, 2017.

(51) Int. Cl.
*G06F 16/23* (2019.01)
*G06F 16/21* (2019.01)
*G06F 3/04842* (2022.01)

(52) U.S. Cl.
CPC ........ *G06F 16/2358* (2019.01); *G06F 16/212* (2019.01); *G06F 16/213* (2019.01); *G06F 3/04842* (2013.01); *G06F 16/23* (2019.01)

(58) Field of Classification Search
CPC .... G06F 3/04842; G06F 16/213; G06F 16/23; G06F 16/212; G06F 16/2358; G06F 17/30

USPC ........................................................ 707/803
See application file for complete search history.

(56) References Cited

U.S. PATENT DOCUMENTS

| | | | |
|---|---|---|---|
| 5,745,753 A | 4/1998 | Mosher et al. | |
| 5,878,408 A | 3/1999 | Van Huben et al. | |
| 6,212,530 B1 | 4/2001 | Kadlec | |
| 6,453,322 B1 | 9/2002 | Dekimpe et al. | |
| 6,490,590 B1 | 12/2002 | Fink | |
| 6,735,593 B1 * | 5/2004 | Williams | G06F 16/288 |
| 7,603,339 B2 | 10/2009 | Cruanes et al. | |
| 7,809,763 B2 | 10/2010 | Nori et al. | |

(Continued)

FOREIGN PATENT DOCUMENTS

WO    WO 2018/053117 A1    3/2018

OTHER PUBLICATIONS

Application and Filing Receipt for U.S. Appl. No. 15/724,333, filed Oct. 4, 2017, Inventor(s): Ledbetter et al.

(Continued)

*Primary Examiner* — Hicham Skhoun
(74) *Attorney, Agent, or Firm* — Patterson Thuente, P.A.

(57) ABSTRACT

Systems and methods for generating database schema change documents based on a data model and model changes indicated by a user. Information items related to one or more objects defined in the data model are received, and user input regarding changed objects is requested. In embodiments, changes are evaluated against configurable design criteria. One or more human and/or machine readable database schema change documents, and are stored in memory. Design criteria and change documents can vary based on a target database platform in embodiments.

18 Claims, 8 Drawing Sheets

(56) References Cited

U.S. PATENT DOCUMENTS

| | | | |
|---|---|---|---|
| 7,953,744 B2 | 5/2011 | Gharat et al. | |
| 8,245,183 B2 | 8/2012 | Iborra et al. | |
| 8,285,684 B2 | 10/2012 | Prahlad et al. | |
| 8,326,902 B2* | 12/2012 | McArdle | G06F 16/288 |
| | | | 707/679 |
| 8,924,398 B2 | 12/2014 | Garza et al. | |
| 9,171,051 B2 | 10/2015 | Raghunathan et al. | |
| 9,305,070 B2 | 4/2016 | Zhu et al. | |
| 9,430,505 B2 | 8/2016 | Padmanabhan et al. | |
| 2003/0204517 A1* | 10/2003 | Skinner | G06F 16/2358 |
| 2004/0015831 A1 | 1/2004 | Bowhill | |
| 2005/0091240 A1 | 4/2005 | Berkowitz et al. | |
| 2005/0097149 A1 | 5/2005 | Vaitzblit et al. | |
| 2005/0197807 A1 | 9/2005 | Nelson et al. | |
| 2005/0234934 A1* | 10/2005 | Mackay | G06F 16/2471 |
| 2006/0020619 A1 | 1/2006 | Netz et al. | |
| 2006/0085465 A1* | 4/2006 | Nori | G06F 16/213 |
| 2007/0300205 A1 | 12/2007 | Scian et al. | |
| 2008/0168081 A1 | 7/2008 | Gaurav et al. | |
| 2008/0208882 A1* | 8/2008 | Zhang | G06F 16/215 |
| 2009/0164508 A1 | 6/2009 | Legault et al. | |
| 2009/0193054 A1* | 7/2009 | Karimisetty | G06F 16/86 |
| 2009/0327711 A1 | 12/2009 | Goldsmid et al. | |
| 2010/0070480 A1* | 3/2010 | Ahuja | G06F 16/23 |
| | | | 707/703 |
| 2010/0274714 A1 | 10/2010 | Sims et al. | |
| 2010/0287529 A1 | 11/2010 | Costa et al. | |
| 2011/0208785 A1* | 8/2011 | Burke | G06F 8/00 |
| | | | 707/803 |
| 2012/0023080 A1 | 1/2012 | Bolohan et al. | |
| 2012/0185464 A1* | 7/2012 | Kuroda | G06F 16/254 |
| | | | 707/722 |
| 2013/0290729 A1 | 10/2013 | Pettigrew et al. | |
| 2014/0095432 A1* | 4/2014 | Trumbull | G06F 16/213 |
| | | | 707/610 |
| 2014/0207731 A1* | 7/2014 | Mack | G06F 16/17 |
| | | | 707/609 |
| 2014/0278755 A1* | 9/2014 | Eberl | G06F 16/244 |
| | | | 705/7.29 |
| 2014/0280047 A1 | 9/2014 | Shukla et al. | |
| 2014/0304229 A1* | 10/2014 | Zhu | G06F 16/27 |
| | | | 707/634 |
| 2015/0095289 A1* | 4/2015 | Prabhu | G06F 16/2358 |
| | | | 707/672 |
| 2015/0199395 A1* | 7/2015 | Greenstein | G06F 16/211 |
| | | | 707/611 |
| 2015/0212896 A1 | 7/2015 | Pawar et al. | |
| 2015/0227562 A1* | 8/2015 | Takahashi | G06F 16/2228 |
| | | | 707/803 |
| 2015/0339119 A1 | 11/2015 | Rehman et al. | |
| 2016/0063064 A1* | 3/2016 | Tanikawa | G06F 16/24573 |
| | | | 707/694 |
| 2016/0179920 A1* | 6/2016 | Milousheff | G06F 16/2379 |
| | | | 707/626 |
| 2016/0224461 A1 | 8/2016 | Araya | |
| 2017/0185921 A1 | 6/2017 | Zhang | |
| 2018/0024901 A1* | 1/2018 | Tankersley | G06F 16/2379 |
| | | | 707/694 |
| 2018/0096043 A1 | 4/2018 | Ledbetter et al. | |
| 2019/0235852 A1 | 8/2019 | Bartolotta et al. | |

OTHER PUBLICATIONS

Dataedo Data Dictionary & ERD creator and Word Processor in one tool; Reverse engineer and document your SQL Sever, Oracle and MySQL databases; https.//dataedo.com/; 12 pages; retrieved Nov. 30, 2016.

SQL Doc Part of the SQL Toolbelt; Database Documentation Generator for SQL Server |SQL Doc; Document your databases automatically; Create documents as HTML, PDF, Microsoft Word or Compiled HTML Help files; http://www.redgate.com/products/sqldevelopment/sqldoc/; 6 pages; retrieved Nov. 30, 2016.

International Search Report and Written Opinion for corresponding International Application No. PCT/US2017/055017 dated Dec. 12, 2017; 18 pages.

International Search Report and Written Opinion for corresponding International Application No. PCT/US2017/051547 dated Dec. 5, 2017; 12 pages.

International Search Report and Written Opinion for corresponding International Application No. PCT/US2018/024885 dated Jun. 27, 2018; 6 pages.

* cited by examiner

```
Da Request: ISDEREQUEST_01
Create Date: 12/8/2016
Model: PRODUCT-ITEM APPLICATIONS/Model Identifier
DBMS Type: Oracle
Schema: Schema1,Schema2
Location(s): Dev, localhost
Project Contact: Dorothy Vaughan
DA Contact: Mary Jackson
Reviewer:  Katherine Johnson
Special Instructions:
```

Create
Table name: New_Table

| Column Name | Is PK | Datatype | Null Option | Default | Check Constr |
|---|---|---|---|---|---|
| New_table_ID | Yes | Number(10) | NOT NULL | | |
| A_field | Yes | NVARCHAR2(14) | NOT NULL | | |

Change
Table name: Existing_Tbl

| Action | Column Name | Is PK | Datatype | Null Option | Default | Check Constr |
|---|---|---|---|---|---|---|
| | Existing_ID | Yes | NUMBER(10) | NOT NULL | | |
| | FieldA | No | VARCHAR(15) | NOT NULL | | |
| | FieldB | No | DATE | NULL | | |
| Add column | FieldC | No | NUMBER(10) | NULL | | |
| Add column | FieldD | No | NUMBER(10) | NULL | | |

FIG. 3

SYSTEMS AND METHODS FOR COMPUTER ASSISTED DATABASE CHANGE DOCUMENTATION

RELATED APPLICATION

The present application claims the benefit of U.S. Provisional Application No. 62/477,504 filed Mar. 28, 2017, which is hereby incorporated herein in its entirety by reference.

TECHNICAL FIELD

Embodiments of the present disclosure relate generally to the field of change document generation and more particularly to the generation of change documents based on a data model.

BACKGROUND

Data modeling is a method for documenting the data design of systems that require data storage and retrieval functionality. Data models can represent data design at a number of levels of detail. At a high level, conceptual models often describe data requirements of a system in business language, with reference to entity classes and the relationships therebetween without reference to physical structures such as tables and columns. At a low level, physical schemas can describe how the data is physically stored within a database system, including file sizes, storage locations, and the like.

At an intermediate level, logical data models (or simply, logical models) often document data requirements at a level that is still abstracted from the physical data structure, but may begin to include concepts such as tables and keys for describing relationships in relational databases. Physical data models can be more specific still, including indices, constraints, and the like.

Data models are useful during a requirements gathering phase of system development, because they allow the data requirements of a system to be specified with less knowledge of or influence by the database platform used in implementation. In development phases, data models can allow database administrators to implement physical data storage solutions that best meet the data requirements for each database. In some very complex systems, a single data model may be physically implemented across a number of databases within one or more database systems running multiple database software platforms. The choice of which level or levels of data models to document can vary based on the needs of organizations or individual development projects.

As used through this disclosure, a database is a structured set of data held in a computer. The structure of the data in a database is defined by a physical schema, which may correspond to all or part of a data model. Database software platforms (such as a database management system, or DBMS) provide functionalities that allow building, modifying, accessing, and updating both databases and the underlying data. Databases and database software reside on database servers. Database servers are collections of hardware and software that provide storage and access to the database and enable execution of the database software.

Physical schemas often include definitions of tables, columns, keys, data types, validation rules, database triggers, stored procedures, domains, and access constraints. Because of their more abstract nature, data models generally define fewer entity (or object) types including tables, attributes (such as columns or fields) and relationships (such as primary or foreign keys). Data models also tend to use more non-technical names for objects, whereas physical schemas are often limited in name length, or more strict standards are enforced.

Data models can be expressed in a variety of forms, including Unified Modeling Language (UML) diagrams or Extensible Markup Language (XML) files. Many software development tools support the creation and modification of data models, including modeling tools such as Open ModelSphere, erwin, and SAP PowerDesigner.

Where a single data model is implemented across multiple databases and physical schemas, change management can become challenging. Because the data model is independent of the underlying physical schema, a translation-like activity needs to be performed to convert between the objects of the data model and precise data definition language (DDL) definitions of the physical schema. In addition, efficient development may require that certain design standards be enforced even at the data model level, in order to ensure consistency between the varied physical schemas.

Therefore, when data models change, it is often necessary to provide not only the updated model, but also documentation describing the changes, and how they should be implemented in each physical schema. When documentation is created manually, it can require slow, manual entry and validation resulting in errors in both the format and content of the documentation. In particular, manual entry can lead to missed changes where a single change requires one or more associated changes to also be made.

SUMMARY

Embodiments of the present disclosure include systems and methods for generating one or more database schema change documents in a consistent format based on a data model and model changes indicated by a user. Embodiments of the present disclosure can produce both human and machine-readable output, and can enforce configurable design standards.

In embodiments, a system for generation documentation comprises a non-volatile memory, a data model interpreter configured to receive information items related to one or more objects defined in the data model, a user interface configured to display at least one of the one or more information items to a user and receive input from the user indicating which objects have changed and any other documentation inputs, a validator configured to indicate design criteria that is not met, and a documentation generator configured to create, and store in the memory, one or more human and/or machine readable database schema change documents, each database schema change document including one or more change requests, and each change request associated with at least one of the one or more changed objects and including each of the one or more documentation inputs associated with each of the one or more associated changed objects.

In embodiments, the content of the change documents and the design criteria evaluated can be specific to a selected database platform. In embodiments, the design criteria can include naming criteria, size criteria, and relationship criteria. In embodiments, the change documents can be displayed to the user in real time.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures.

FIG. 3 is a listing of an example change document according to an embodiment.

Figure 1:
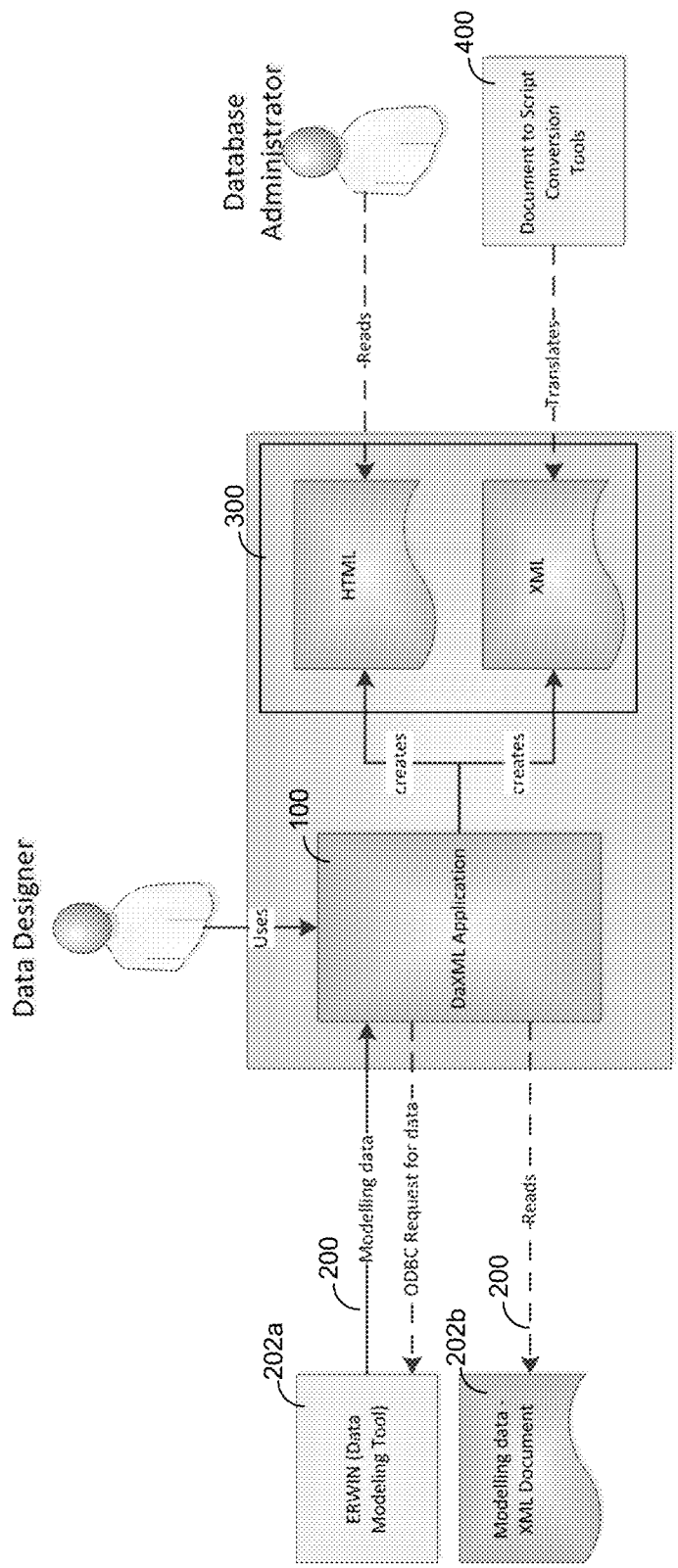
FIG. 1 is a schematic view depicting inputs and outputs of a change documentation system according to an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

FIG. 1 is a schematic diagram depicting the context of a database change documentation generation system 100, according to an embodiment. System 100 receives a data model 200 from a data model source, such as a data modeling tool 202a or a document 202b. System 100 produces database change documentation 300, which can be read by a user, or an automated DDL generation tool.

As will be described, system 100 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but also to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the disclosure.

In embodiments, the system or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field-10 programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engine, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

As an example, a system 100, data model sources 202, and database change documentation 300 may be present on a single computing device in an embodiment. In other embodiments, depicted components may reside on two or more separate computing devices.

Figure 2:
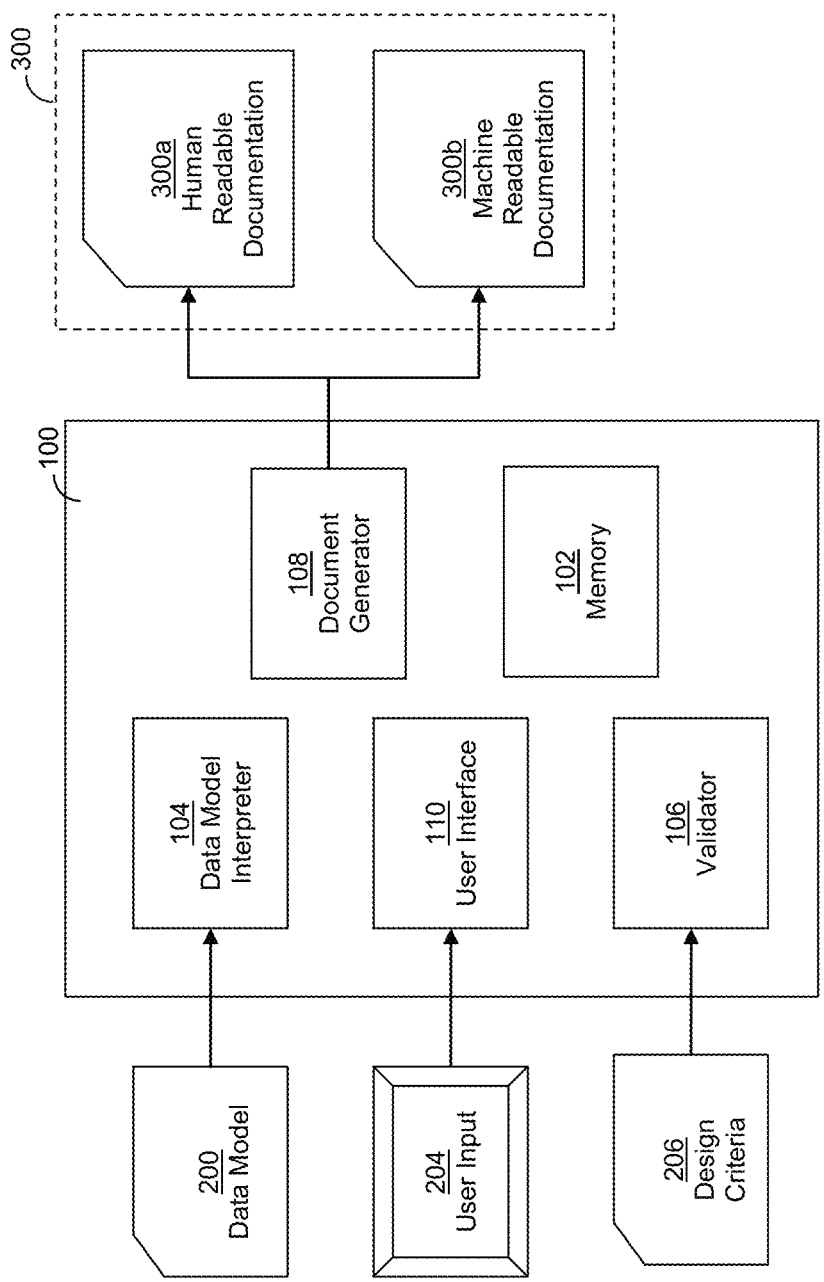
FIG. 2 is a block diagram depicting components of a change documentation system according to an embodiment.

FIG. 2 is a block diagram partially depicting the engines, inputs and outputs of system 100. The various engines of system 100 interact with memory 102 for storage and retrieval of data during and after processing. Data model interpreter 104 is configured to receive data model 200 from one or more data model sources (202, depicted in FIG. 1). In embodiments, data model sources 202 can comprise data modeling software tools 202a, such as erwin. In embodiments data model sources 202 can comprise data model files 202b, such as XML files including the definition of data model 200. In embodiments, data model interpreter 104 can request data model 200 from a data modeling software tool 202a via an application programming interface (API) such as an open database connectivity (ODBC), Java database connectivity (JDBC) or other API. In embodiments, data model interpreter 104 can make an API request to a local data modeling software tool 202a, or over a wired or wireless connection. In embodiments, data model interpreter 104 can receive a data model file 202b from a local data source (such as a hard drive) or via a wired or wireless connection. In embodiments, data model 200 can represent only a portion of a larger data model present on data model sources 202a or 202b. Those of ordinary skill in the art will appreciate that all or part of data model 200 can be received from one or more separate sources.

Document generator 108 is configured to generate change documentation 300, comprising a set of one or more changes to be made to a physical schema (or other logical, conceptual or physical data model) based on at least data model 200 and user input 204. In embodiments, change documentation 300 can be one or more files in both human readable 300a and machine readable 300b formats. For example, in embodiments, change documentation can comprise one or more hypertext markup language (HTML), XML, portable document format (PDF), postscript (PS), or other files. In embodiments, change documentation 300 can vary based on the target database platform of the physical schema. For example, change documentation 300 can contain different content when generated for a MySQL platform, versus an Oracle or Informix platform.

FIG. 3 is a partial view of an example change document 300, according to an embodiment. Change documentation 300 can include header data 304, including a request identifier, an identifier of the data model 200, identification of the affected schema(s), location(s) of the affected database systems, contact information, special instructions, or other desired header data.

Change documentation 300 can further include one or more change entries 306. Each change entry 306 can is associated with an object 308, having an object type (such as Table, View, Synonym, Sequence, Foreign Key, Procedure, Columns, Indexes, Binary Indexes, Primary Keys, Unique Keys, or Triggers). Each change entry 306 further includes an action 310 (such as Create/Add, Delete, Rename or Modify) and a change listing 312 in embodiments.

In embodiments, the contents of change list 312 can vary based on the type of object 308 and the action 310. For example, actions 310 for table objects can include Create, Delete, and Rename. In embodiments, a change listing 312 for a create change entry for a table (such as 306a) can include a list of columns, including attributes such as column name, column data type, whether the column is a primary key (is PK), whether the column can be null, default value, and any applicable constraints. In embodiments, actions for objects of type Column can include Add, Delete, Rename, and Modify. In embodiments, referential constraint actions can include Create and Delete. In embodiments, change documentation file 302 can be structured hierarchically, such that objects such as Columns are listed in reference to their parent Table objects (such as for the add column actions of 306b).

Validator 106 is optionally configured to receive one or more design criteria 206, each design criteria 206 defining a rule that should be met by data model 200. In embodiments, design criteria 206 can be provided via user interface 110, hard-coded within system 100 itself, or loaded from one or more design criteria files (on the local computing devices or remotely). In embodiments, design criteria 206 can be specific to one or more DBMS platforms. For example, different design criteria 206 may be validated for MySQL implementations than for Informix implementations. In embodiments, design criteria 206 can comprise data model criteria, and action criteria.

In embodiments, data model criteria can include table name length, column name length, object name format requirements, and recommended datatypes based on column size. While some example data model criteria are included in Table 1 below; those of ordinary skill in the art will appreciate that more, fewer, or other data model criteria can be used:

TABLE 1

| Table name length | Must not exceed 26 characters |
| Column name length | Must not exceed 26 characters |
| Table name format | Must begin with an upper or lowercase alphabetic character |
| Column name format | Must begin with an upper or lowercase alphabetic character |

| | Datatype | Must end with |
| --- | --- | --- |
| Column name format | Number | _nbr |
| | Identifier | _id |
| | Description | _desc |
| | Name | _nm |
| Column data type | If column size is greater than 255, should be lvarchar for Informix platform, and memo for SQL Server platform. | |

While Table 1 depicts an embodiment in which column name suffixes are validated based on datatype, other embodiments may validate only that column names end with known suffixes, regardless of data type.

Action criteria can define secondary actions that are required or implied by a primary action. For example, if a new primary key column has been added, an add to key action may also be required. In addition, when a new table is created that has child tables, one or more create referential constraint actions may also be required.

In embodiments, validator 106 can present one or more warning messages to the user when criteria are not met. In embodiments, document generator 108 can be configured to only generate change documentation 300 when all have been. In embodiments, one or more criteria can be optional, such that document generator 108 will generate change documentation 300 regardless. Validator 106 can therefore operate prior to generation of change documentation 300 by document generator 108.

User interface 110 is configured to receive user input 204. User input 204 can include configuration information such as the location of one or more data models 200, the location to store generated change documentation 300, and the location of data (such as configuration files) defining design criteria 206, in embodiments. In embodiments, user input 204 can include direct input of design criteria 206.

Figure 4A:
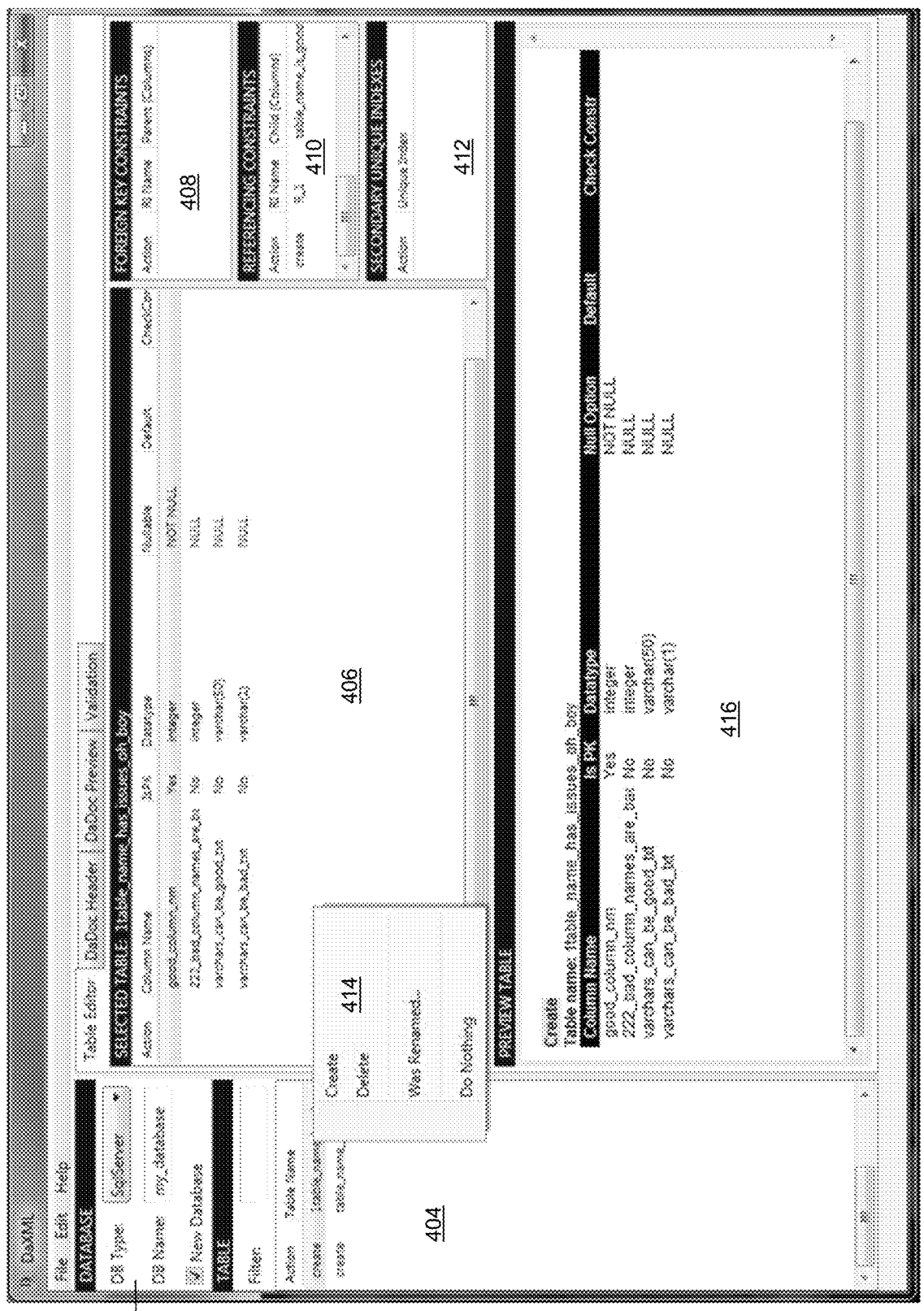
FIG. 4A is a screen shot depicting a user interface of a change documentation system according to an embodiment.

User input 204 can further include one or more change indications provided by the user based on the display of all or a portion of data model 200. FIGS. 4A-4D are a series of screenshots depicting various screens of user interface 110 configured to receive user input 204. As can be seen in FIG. 4A, user interface 110 can present a database information region 402, enabling the user to enter database information, including the database platform, a database name, and an indication of whether the database is new.

User interface 110 can further present a table selection region 404, configured to display each table present in data model 200, and allow the user to select a table to view in more detail. Table details are displayed in column region 406, foreign key region 408, referencing constraints region 410, and secondary unique indices region 412. As depicted in FIG. 4A, each region 404, 406, 408, 410, and 412 includes an indicator of whether each item listed has an associated action. Table actions can be chosen through table menu 414, and a portion of change documentation 300 associated with the currently selected table is displayed at 416.

Figure 4B:
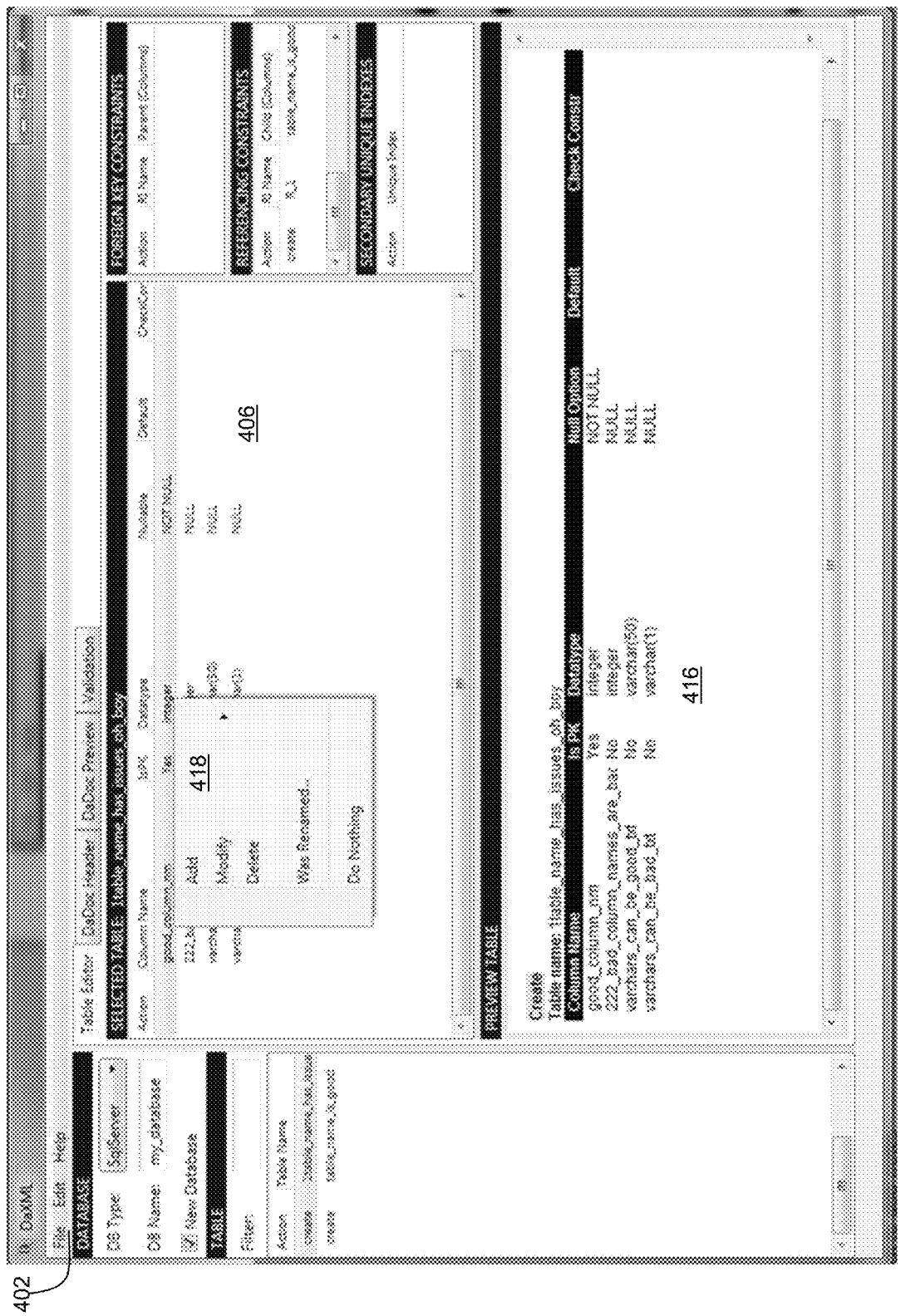
FIG. 4B is a screen shot depicting a user interface of a change documentation system according to an embodiment.

As can be seen in FIG. 4B, column actions can be chosen through column menu 418. Similar menus can exist for other object types such as foreign keys, referencing constraints, and secondary unique indices. As discussed above, validator 106 can determine any changes that may be required by a user requested change based on one or more action criteria. In embodiments, when a user requested change implies one or more required changes, the required changes can be automatically marked in user interface 110.

Figure 4C:
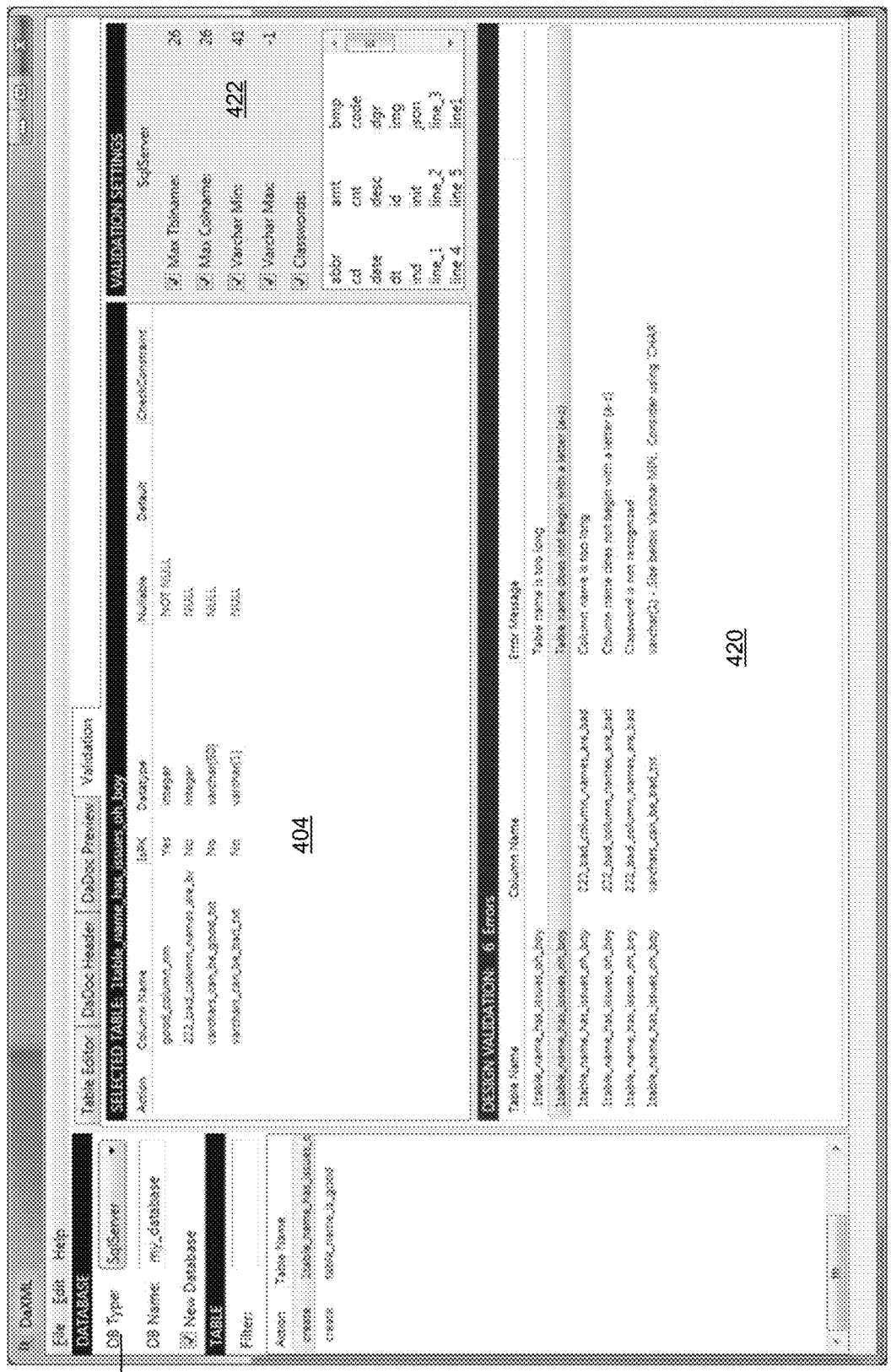
FIG. 4C is a screen shot depicting a user interface of a change documentation system according to an embodiment.

FIG. 4C depicts a validation tab, according to an embodiment. Validation region 420 lists any active data model criteria that are not met by data model 200. Criteria selection region 422 includes a list of design criteria 206 and provides checkboxes allowing the user to deactivate one or more design criteria 206 on the fly.

Figure 4D:
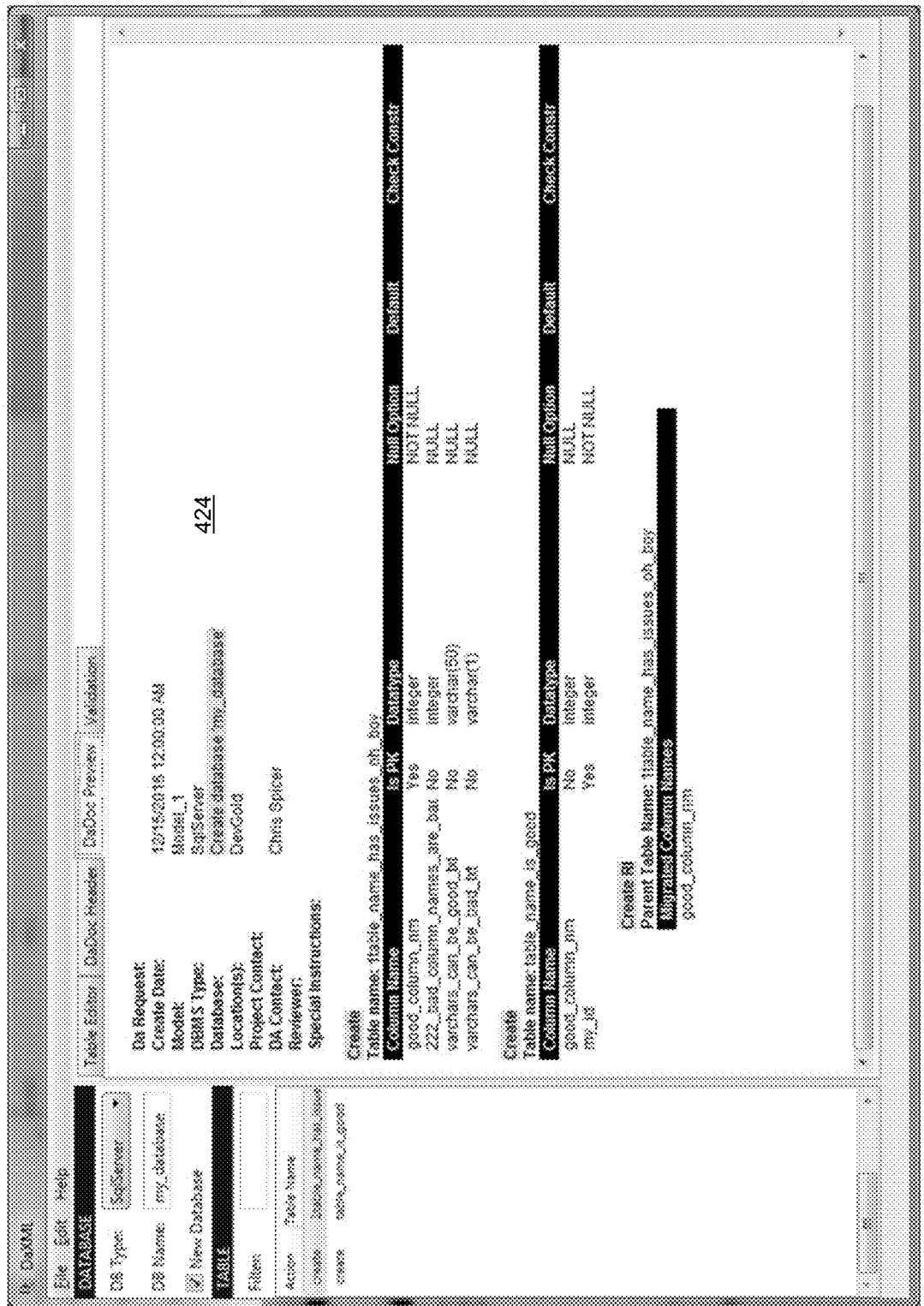
FIG. 4D is a screen shot depicting a user interface of a change documentation system according to an embodiment.

FIG. 4D depicts a preview tab, according to an embodiment. Preview tab includes preview region 424, which provides a preview of change documentation 300 based on data model 200 and user input 204. In embodiments, preview region 424 can present a human readable view of change documentation 300. In embodiments, preview region 424 can present a machine readable view of change documentation 300.

User interface 110 can also present one or more regions enabling optional user input of change commentary associated with each action. User interface 110 can further present header tab, enabling the user to provide data for header 304 of change documentation 300.

While user interface 110 is depicted as using graphical user interface (GUI) controls such as menus, tabs, select boxes, and tables in the embodiment of FIGS. 4A-4D, those of ordinary skill in the art will appreciate that user interface 110 can be presented in other formats. For example, other GUI elements can be used in embodiments. In embodiments, user interface 110 can be any type of interface allowing presentation to the user and input from the user. For example, in embodiments, user interface 110 can be a command line interface, a web client, a mobile application, or a programmatic interface such as an API or DLL enabling control of system 100 by other software systems and components.

In embodiments, user input 204 can include configuration flags that are used by user interface 110 to modify the options provided to the user. For example, configuration flags can determine whether certain object types are displayed or can have actions associated with them by the user. In embodiments, configuration flags can include: a unique index flag that determines whether unique secondary indexes are displayed; a show referential constraints (or RI) flag that determines whether referential constraints are displayed; a referential constraints name flag that determines whether the names of any referential constraints are displayed; a schema flag which will determine whether the term "database" will be replaced by the word "schema" in the change documentation 300; or a check constraints flag that determines whether the check constraints on the columns will be displayed.

Figure 5:
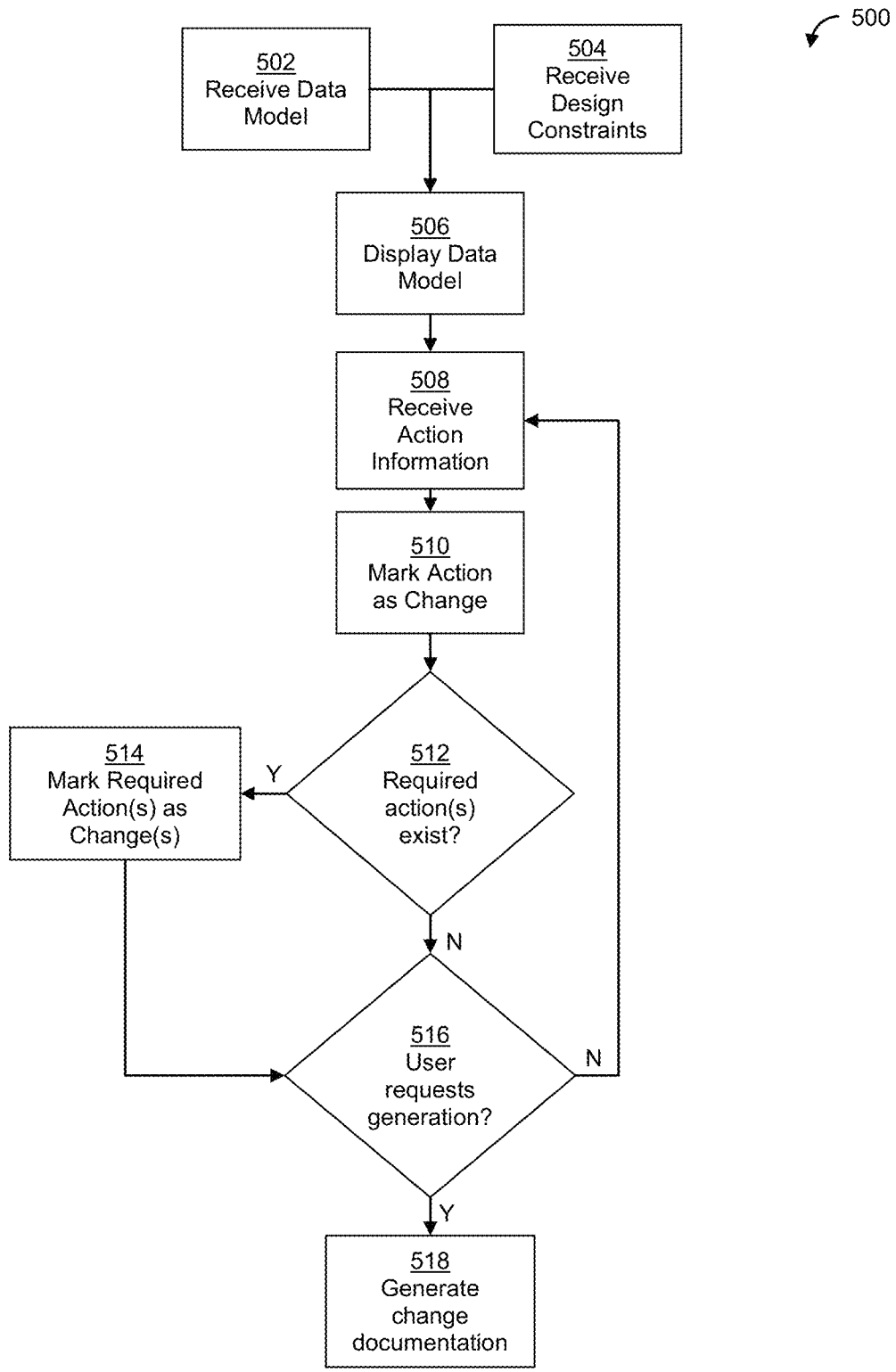
FIG. 5 is a flowchart depicting a method for generating change documentation according to an embodiment.

In operation, embodiments of system 100 can be used to execute method 500, as depicted in FIG. 5. The data model 200 and any design criteria 206 are received at 502 and 504. Also at 502, user input regarding a selected database platform can be provided. The data model is displayed to the user via user interface 110 at 506. User input regarding actions is received at 508 and the action is marked as a change at 510. If, at 512, the user has marked an action that requires further action(s) based on design criteria 206, the further action(s) can be marked at 514. At 516, if the user requests generation of change documentation 300, change documentation can be generated at 518, if not, control can return to 508 for receipt of more user input. Change documentation 300 is generated by creating a change entry 306 based on the selected database platform for each change marked at tasks 510 and 514.

Those of ordinary skill in the art will recognize that method 500 can include more, fewer, or alternate tasks in embodiments, and that the tasks of method 500 can be performed in an order different to that depicted here, in embodiments.

Embodiments of system 100 can assist in the automatic generation of standardized database change documentation for multiple target database platforms, including SQL Server, Informix, UDB, Oracle, Teradata, Greenplum and DB2 from a single data model.

Embodiments of system 100 can provide an indication of user-specified, platform-specific criteria that are not met to the user, while still allowing the user to generate the change documentation if desired.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for generating database schema change documents based on one or more changes in a data model, the system comprising:
   a non-volatile memory;
   a data model interpreter configured to receive information items related to one or more objects defined in the data model;
   a user interface configured to:
     display at least one of the one or more information items to a user,
     receive an indication of one or more changed objects from the user, and
     receive one or more documentation inputs from the user, each documentation input associated with at least one changed object;
   a validator configured to apply at least one rule defined by one or more design criteria to be met by the data model to each of the one or more changed objects and, in response to at least one changed object not satisfying the at least one rule, present a validation region including all changed objects not satisfying the at least one rule for the user to review prior to creation of one or more database schema change documents and prior to implementation of the data model on a target database, the validation region allowing the user to choose between deactivating the one or more design criteria or revising the one or more changed objects such that the at least one rule becomes satisfied; and
   a documentation generator configured to, in response to the at least one change object satisfying the at least one rule or the unsatisfied data model criteria being deactivated, create, and store in the memory, the one or more database schema change documents, each database schema change document including one or more change requests, and each change request associated with at least one of the one or more changed objects and including each of the one or more documentation inputs associated with each of the one or more associated changed objects.

2. The system of claim 1, wherein at least one of the database schema change documents is a human-readable document.

3. The system of claim 1, wherein at least one of the database schema change documents is a machine-readable document, whereby each of the one or more change requests can be implemented programmatically.

4. The system of claim 1, wherein the user interface is further configured to receive a platform selection input from a user, the platform selection input relating to one or more database platforms.

5. The system of claim 4, wherein each of the one or more change requests is generated based on the platform selection input.

6. The system of claim 4, wherein each of the one or more design criteria is associated with a database platform, and wherein the validator is further configured to evaluate only design criteria that are associated with the one or more database platforms relating to the platform selection input.

7. The system of claim 1, wherein each of the design criteria is selected from the group consisting of: naming criteria, size criteria, and relationship criteria.

8. The system of claim 1, wherein the user interface is further configured to display each of the database schema change documents to the user.

9. The system of claim 1, wherein the data model interpreter is configured to receive the information related to one or more objects defined in the data model programmatically from a modeling tool.

10. A method for generating database schema change documents based on one or more changes in a data model, the method comprising:
    receiving one or more information items related to one or more objects defined in the data model;
    presenting a user interface and displaying at least one of the one or more information items to a user through the user interface;
    receiving an indication of one or more changed objects from the user;
    receiving one or more documentation inputs from the user, each documentation input associated with at least one changed object;
    applying at least one rule defined by one or more design criteria to be met by the data model to each of the one or more changed objects and, in response to at least one changed object not satisfying the at least one rule, presenting a validation region including all changed objects not satisfying the at least one rule for the user to review prior to creation of one or more database schema change documents and prior to implementation of the data model on a target database, the validation region allowing the user to choose between deactivating the one or more design criteria or revising the one or more changed objects such that the at least one rule becomes satisfied; and
    creating, in response to the at least one change object satisfying the at least one rule or the unsatisfied data model criteria being deactivated, one or more database schema change documents, each database schema change document including one or more change requests, and each change request associated with at least one of the one or more changed objects and including each of the one or more documentation inputs associated with each of the one or more associated changed objects; and
    storing the database schema changes in a non-volatile memory.

11. The method of claim 10, wherein at least one of the database schema change documents is a human-readable document.

12. The method of claim 10, wherein at least one of the database schema change documents is a machine-readable document, whereby each of the one or more change requests can be implemented programmatically.

13. The method of claim 10, further comprising receiving a platform selection input relating to one or more database platforms from the user.

14. The method of claim 13, wherein each of the one or more change requests is generated based on the platform selection input.

15. The method of claim 13, wherein each of the one or more design criteria is associated with a database platform, the method further comprising evaluating only design criteria that are associated with the one or more database platforms relating to the platform selection input.

16. The method of claim 10, wherein each of the design criteria is selected from the group consisting of: naming criteria, size criteria, and relationship criteria.

17. The method of claim 10, further comprising displaying each of the database schema change documents to the user.

18. The method of claim 10, wherein the information related to one or more objects defined in the data model is received programmatically from a modeling tool.

* * * * *